(12) United States Patent
Krishnakumar et al.

(10) Patent No.: US 11,507,205 B2
(45) Date of Patent: Nov. 22, 2022

(54) SMART MOUSE FOR AN INFORMATION HANDLING SYSTEM

(71) Applicant: Dell Products L.P., Round Rock, TX (US)

(72) Inventors: Karthikeyan Krishnakumar, Austin, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/448,239

(22) Filed: Sep. 21, 2021

(65) Prior Publication Data

US 2022/0004270 A1    Jan. 6, 2022

Related U.S. Application Data

(63) Continuation of application No. 16/697,451, filed on Nov. 27, 2019, now Pat. No. 11,157,092.

(51) Int. Cl.
*G06F 3/0354* (2013.01)
*G06F 1/16* (2006.01)
*G06F 3/01* (2006.01)
*G06F 3/03* (2006.01)
*G09G 5/00* (2006.01)

(52) U.S. Cl.
CPC .......... *G06F 3/03543* (2013.01); *G06F 1/169* (2013.01); *G06F 3/0304* (2013.01); *G06F 2203/0337* (2013.01)

(58) Field of Classification Search
CPC ....... G06F 3/0304–03543; G06F 1/169; G06F 2203/0337
See application file for complete search history.

(56) References Cited

U.S. PATENT DOCUMENTS

| | | | |
|---|---|---|---|
| 6,697,043 B1 * | 2/2004 | Shahoian | A63F 13/06 345/156 |
| 2002/0035701 A1 * | 3/2002 | Casebolt | G06F 3/0317 713/300 |
| 2008/0198134 A1 | 8/2008 | Huang et al. | |
| 2008/0284735 A1 | 11/2008 | Shim | |
| 2016/0209941 A1 * | 7/2016 | Hadas | G06F 3/03543 |
| 2017/0220132 A1 * | 8/2017 | O'Mahony | G06F 3/03543 |
| 2018/0260043 A1 * | 9/2018 | Forde | G06F 3/017 |
| 2019/0079584 A1 * | 3/2019 | Bonanno | G06F 3/016 |
| 2019/0171302 A1 * | 6/2019 | Su | G06F 3/03543 |

* cited by examiner

*Primary Examiner* — Lin Li
(74) *Attorney, Agent, or Firm* — McDermott Will & Emery LLP

(57) ABSTRACT

Systems and methods are disclosed for a smart mouse that may include transmitting, by the mechanical switch of the smart mouse, a signal to a microcontroller unit of the smart mouse in response to a movement of the smart mouse caused by a user, the movement causing the mechanical switch to be in a closed position, the signal indicating that the mechanical switch is in the closed position; receiving, by the microcontroller unit, the signal indicating that the mechanical switch is in the closed position; and in response to receiving the signal: causing, by a power switch of the smart mouse, at least one battery of the smart mouse to provide power to an optical unit of the smart mouse, the provided power causing the optical unit to be in an on state, the on state of the optical unit causing the smart mouse to be electrically enabled for use.

14 Claims, 6 Drawing Sheets

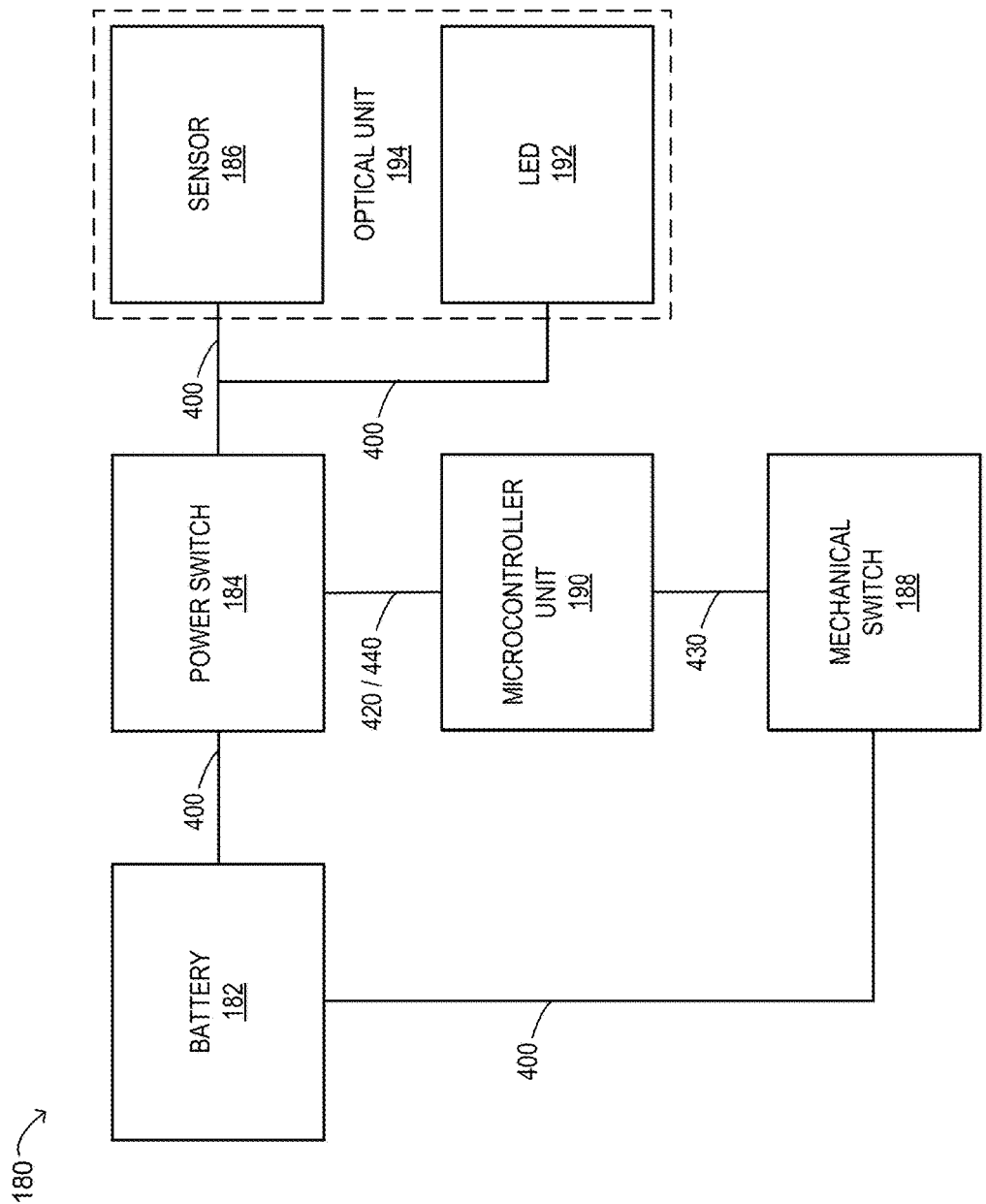

SMART MOUSE FOR AN INFORMATION HANDLING SYSTEM

BACKGROUND

Field of the Disclosure

The disclosure relates generally to information handling systems, and in particular to a smart mouse for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed smart mouse for an information handling system includes: at least one battery; a microcontroller unit; an optical unit having an on state and an off state, the on state of the optical unit causing the smart mouse to be electrically enabled for use, the off state of the optical unit causing the smart mouse to be electrically disabled for use; and a mechanical switch having an open position and a closed position, the mechanical switch configured to transmit a signal to the microcontroller unit in response to a movement of the smart mouse caused by a user, the movement of the smart mouse causing the mechanical switch to be in the closed position; the microcontroller unit configured to: receive the signal from the mechanical switch; and cause the at least one battery to provide power to the optical unit, the provided power causing the optical unit to be in the on state, the on state of the optical unit causing the smart mouse to be electrically enabled for use.

In one or more of the disclosed embodiments, the microcontroller unit is further configured to: monitor the smart mouse for an additional movement of the smart mouse caused by the user; determine if a first threshold period has occurred, the first threshold period comprising a period of time in which the additional movement of the smart mouse caused by the user has ended; and in response to determining that the first threshold period has occurred: cause the microcontroller unit to be in an idle state; determine if a second threshold period has occurred, the second threshold period comprising a period of time in which the microcontroller unit has been in the idle state; and in response to determining that the second threshold period has occurred: cause the at least one battery to refrain from providing power to the optical unit causing the optical unit to be in the off state, the off state of the optical unit causing the smart mouse to be electrically disabled for use.

In one or more of the disclosed embodiments, the smart mouse further includes: a power switch electrically coupling the at least one battery to the optical unit, the power switch having an open power switch position and a closed power switch position, the power switch configured to: receive a close signal transmitted from the microcontroller unit in response to the microcontroller unit receiving the signal from the mechanical switch; and in response to receiving the close signal, cause the power switch to be in the closed power switch position, the closed power switch position causing the at least one battery to provide power to the optical unit causing the optical unit to be in the on state.

In one or more of the disclosed embodiments, the power switch is further configured to: receive an open signal transmitted from the microcontroller unit in response to the microcontroller unit determining that the second threshold period has occurred; and in response to receiving the open signal, cause the power switch to be in the open power switch position, the open power switch position causing the at least one battery to refrain from proving power to the optical unit causing the optical unit to be in the off state.

In one or more of the disclosed embodiments, the mechanical switch includes: a pendulum pivot fastener configured to removably couple the mechanical switch to the smart mouse; a pendulum arm having a first pendulum end and a second pendulum end, the first pendulum end including a pendulum hole configured to rotatably couple with the pendulum pivot fastener, the second pendulum end including a pendulum weight configured cause the pendulum arm to pivot about the pendulum hole in response to the movement of the smart mouse caused by the user; a switch spring finger removably coupled to the pendulum arm; an assembly bracket having a first bracket end and a second bracket end, the first bracket end including a bracket hole configured to couple with the pendulum pivot fastener, the second bracket end including a semicircular hole configured to allow the switch spring finger to traverse the semicircular hole as the pendulum arm pivots about the pendulum hole; and a switch board removably coupled to the assembly bracket, the switch board including one or more contact pads, each contact pad configured to electrically couple with the switch spring finger when the switch spring finger traverses the semicircular hole of the assembly bracket, wherein the electric coupling generates the signal transmitted to the microcontroller unit in response to the movement of the smart mouse caused by the user.

In one or more of the disclosed embodiments, the optical unit includes at least one of: a light emitting diode (LED) configured to illuminate a surface underneath the smart mouse; and a sensor configured to capture a plurality of successive images of the surface to detect a movement of the smart mouse.

In one or more of the disclosed embodiments, the movement of the smart mouse caused by the user comprises a lateral movement caused by one or more lateral forces applied to the smart mouse by the user.

In one or more of the disclosed embodiments, the signal transmitted to the microcontroller unit in response to the movement of the smart mouse caused by the user comprises a general-purpose input/output (GPIO) signal.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 4 is a block diagram of selected elements of an embodiment of a smart mouse.

DESCRIPTION OF PARTICULAR EMBODIMENT(S)

Figure 1:
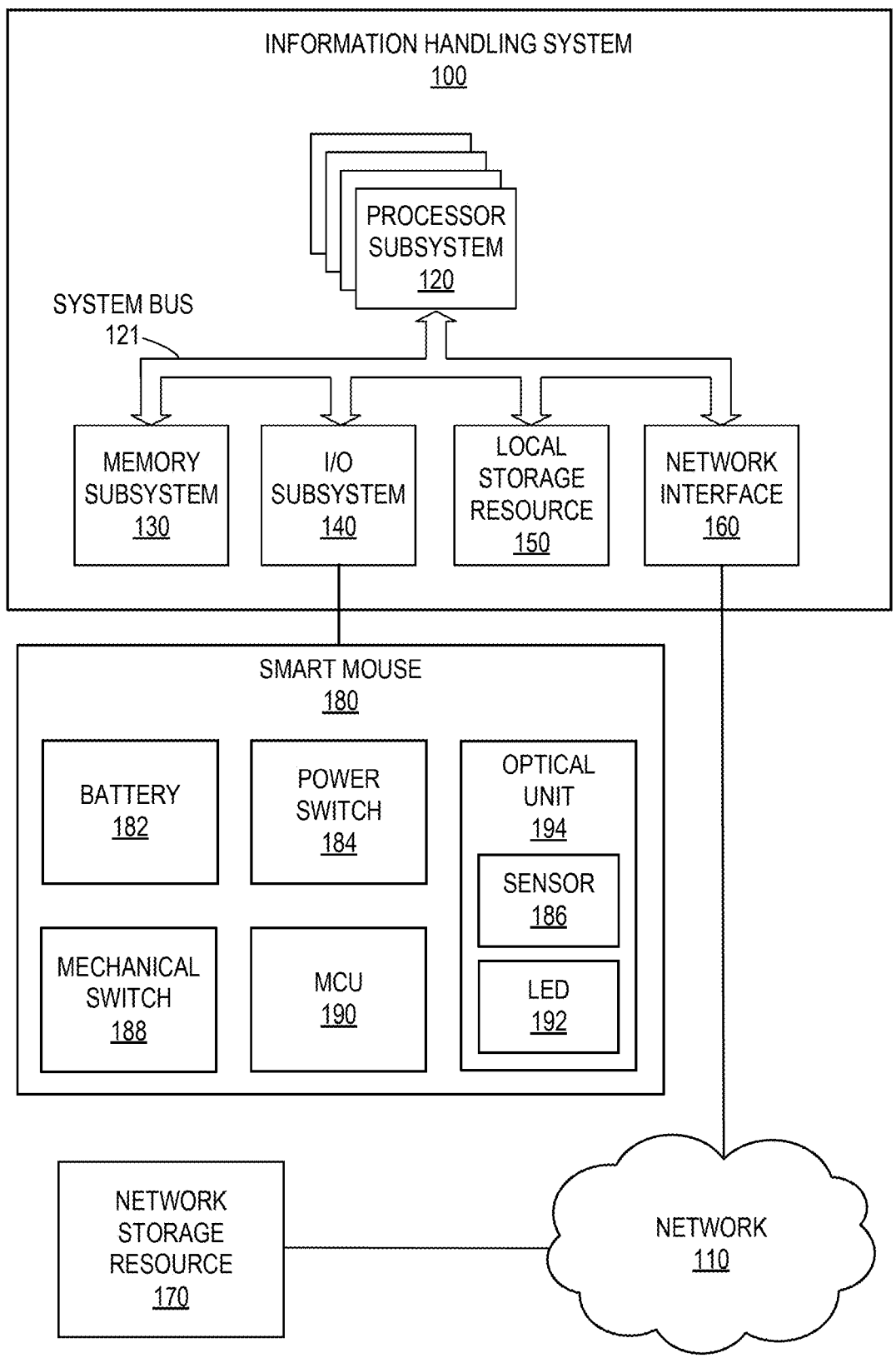
FIG. 1 is a block diagram of selected elements of an embodiment of an information handling system that includes a smart mouse.

This document describes a smart mouse for an information handling system that may include: at least one battery; a microcontroller unit; an optical unit having an on state and an off state, the on state of the optical unit causing the smart mouse to be electrically enabled for use, the off state of the optical unit causing the smart mouse to be electrically disabled for use; and a mechanical switch having an open position and a closed position, the mechanical switch configured to transmit a signal to the microcontroller unit in response to a movement of the smart mouse caused by a user, the movement of the smart mouse causing the mechanical switch to be in the closed position; the microcontroller unit configured to: receive the signal from the mechanical switch; and cause the at least one battery to provide power to the optical unit, the provided power causing the optical unit to be in the on state, the on state of the optical unit causing the smart mouse to be electrically enabled for use.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140 communicatively coupled to a smart mouse 180, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

In information handling system 100, smart mouse 180 may comprise a system, device, or apparatus generally operable to receive input from a user of information handling system 100. In particular, smart mouse 180 may be or include a peripheral hardware input device used to control a cursor displayed within a graphical user interface (GUI) of information handling system 100. For example, smart mouse 180 may be used to select text, icons, files, and/or folders displayed to a user within a GUI of information handling system 100. In one embodiment, smart mouse 180 may be communicatively coupled to I/O subsystem 140 of information handling system 100 via a wired connection (e.g., via USB connection). In another embodiment, smart mouse 180 may be communicatively coupled to I/O subsystem 140 of information handling system 100 via wireless connection (e.g., via radio frequency, infrared, Bluetooth technology, and the like). In the embodiment illustrated in FIG. 1, smart mouse 180 includes at least one battery 182, a power switch 184, a mechanical switch 188, a microcontroller unit (MCU) 190, and an optical unit 194. In other embodiments, smart mouse 180 may include additional, fewer, and/or any combination of devices or elements suitable for receiving user input from a user of information handling system 100.

Conventional wireless mouse devices may include a sensor (e.g., an optical sensor) and/or a light emitting diode (LED). These conventional sensors may be comprised of a complementary metal-oxide semiconductor (CMOS) capable of capturing a series of images to detect movement of the wireless mouse relative to a surface (e.g., such as a desk surface). The LED may be used to provide the sensor with light while the wireless mouse device is in use. To conserve battery life, conventional wireless mouse devices may include several respective states that allow the wireless mouse devices to conserve power when not receiving input from users. Specifically, a conventional wireless mouse device may include an active state in which the wireless mouse device receives input from a user, an idle state in which the wireless mouse device is no longer receiving input from the user (e.g., after 20 seconds), and a sleep state in which the wireless mouse may enter a low power consumption mode in response to prolonged periods of inactivity (e.g., after 10 to 15 minutes).

While in sleep state, the sensor and/or LED of a conventional wireless mouse device may remain in the low power consumption mode in order to detect movement, or an input, from a user. In addition, each wireless mouse device may include an internal microcontroller unit that remains in the low power consumption mode such that it may wake up the wireless mouse device when the sensor detects an input from the user. However, a conventional wireless mouse device may spend a majority (e.g., 97%) of its lifecycle in idle and/or sleep states with its sensor and/or LED utilizing a significant portion (e.g., 90%) of its overall power consumption while in the idle and/or sleep states. This is nonideal in that battery life may be a deciding factor in purchasing decisions made by consumers regarding wireless peripheral devices. Therefore, smart mouse 180 includes mechanical switch 188 to passively detect input from a user of information handling system 100 such that optical unit 194 (i.e., sensor 186 and LED 192) may be turned off by MCU 190 via power switch 184 in response to periods of inactivity. When mechanical switch 188 of smart mouse 180 detects a movement of smart mouse 180 caused by a user, optical unit 194 may be powered on by MCU 190 such that smart mouse 180 may again be electrically enabled for use. In this way, smart mouse 180 may significantly extend the battery life of battery 182. For example, the battery life may be extended from 48 months to 68 months resulting in an approximate 41% increase over conventional wireless mouse devices.

In the embodiment illustrated in FIG. 1, optical unit 194 may be a suitable system, apparatus, or device operable to capture images to detect movement of smart mouse 180. In particular, optical unit 194 can detect movement of smart mouse 180 such that each detected movement may correlate to a movement of a cursor displayed within a GUI of information handling system 100. In the embodiment illustrated in FIG. 1, optical unit 194 includes sensor 186 and LED 192. In one embodiment, sensor 186 may be or include an optoelectronic sensor used to capture successive images of a surface upon which smart mouse 180 is placed (e.g., a desk surface, table surface, mouse pad, and the like) such that the successive images may be compared to detect motion. Sensor 186 may capture successive images while in an on state to detect movement of smart mouse 180. LED 192 may be used as a light source for sensor 186, illuminating the surface underneath smart mouse 180 while LED 192 is in an on state. The respective on states of sensor 186 and LED 192 are collectively referred to herein as an "on state" of optical unit 194. In response to periods of inactivity in which smart mouse 180 does not receive additional movement caused by a user, sensor 186 may be powered down in an off state such that sensor 186 no longer captures successive images in order to conserve the battery life of battery 182. In addition, LED 192 may be powered down in an off state in response to the periods of inactivity. The respective off states of sensor 186 and LED 192 are collectively referred to herein as an "off state" of optical unit 194.

In the embodiment illustrated in FIG. 1, MCU 190 may be a suitable system, apparatus, or device operable to electrically enable and electrically disable smart mouse 180 for use. In particular, MCU 190 may cause battery 182 to provide power to optical unit 194 upon smart mouse 180 receiving an input from a user (e.g., a user causing smart mouse 180 to move). Battery 182 may provide power to optical unit 194 such that optical unit 194 can capture images to detect movement of smart mouse 180. That is, MCU 190 may cause smart mouse 180 to be electrically enabled for use in response to smart mouse 180 being moved by a user (e.g., such as a user applying one or more lateral forces to smart mouse 180 causing smart mouse 180 to move). In contrast, MCU 190 may cause battery 182 to refrain from providing power to optical unit 194 in response to periods of inactivity in which no movement of smart mouse 180 is detected by mechanical switch 188. In response to a loss of power supplied by battery 182, optical unit 194 may be unable to capture images to detect movement of smart mouse 180. That is, MCU 190 may cause smart mouse 180 to be electrically disabled for use in response to periods of inactivity in which smart mouse 180 remains motionless.

To identify periods of inactivity, MCU 190 can monitor smart mouse 180 for movement caused by a user following the initial movement that caused optical unit 194 to be in the on state, or an "additional movement." MCU 190 can determine a period of time in which the additional movement caused by the user has ended, or a "first threshold period," and can cause MCU 190 to be in a low power-consumption state, or an "idle state," in response to determining that the first threshold period has occurred. For example, if a user allows smart mouse 180 to remain inactive for 5 minutes, MCU 190 may determine that a first threshold period has occurred and can cause MCU 190 to be in the idle state to conserve battery life of battery 182. MCU 190 may additionally determine a period of time in which MCU 190 has been in the idle state, or a "second threshold period." In response to determining that the second threshold period has occurred, MCU 190 can cause battery 182 to refrain from providing power to optical unit 194 causing optical unit 194 to be in the off state and smart mouse 180 to be electrically disabled for use. For example, MCU 190 may determine that smart mouse 180 has been in the idle state for 15 minutes following the first threshold period and can cause optical unit 194 to be in the off state based on the occurrence of the second threshold period.

In the embodiment illustrated in FIG. 1, mechanical switch 188 may be a suitable system, apparatus, or device operable to detect a movement of smart mouse 180 caused by a user such that smart mouse 180 may become electrically enabled for use. In particular, mechanical switch 188 may electrically couple battery 182 to MCU 190 such that mechanical switch 188 can complete the electrical circuit (i.e., comprised of mechanical switch 188, battery 182, and MCU 190) while in a "closed position" in response to a movement of smart mouse 180 caused by a user. Mechanical switch 188 may transmit a signal (e.g., a GPIO signal) to MCU 190 while in the closed position indicating that a user has caused smart mouse 180 to move. In response to receiving the signal transmitted by mechanical switch 188, MCU 190 may cause battery 182 to provide power to optical unit 194, thereby causing optical unit 194 to be in the on state and smart mouse 180 to be electrically enabled for use. Mechanical switch 188 may return to an "open position" in response to periods of inactivity in which smart mouse 180 does not receive additional movement from a user, thereby breaking the electrical circuit such that mechanical switch 188 no longer transmits the signal to MCU 190 indicating a movement of smart mouse 180 caused by a user. In one embodiment, mechanical switch 188 may be or include a pendulum switch that swings in response to movement of smart mouse 180 caused by a user. In other embodiments, mechanical switch 188 may be or include a mercury switch, a reed switch, a piezo switch, and/or any other mechanical switch suitable for detecting a movement of smart mouse 180 caused by a user. Mechanical switch 188 is described in further detail with respect to FIGS. 2 and 3.

In the embodiment illustrated in FIG. 1, battery 182 may be a suitable system, apparatus, or device operable to provide power to optical unit 194 thereby causing smart mouse 180 to be electrically enabled for use. In one embodiment, battery 182 may be electrically coupled to optical unit 194 via power switch 184 such that MCU 190 may cause battery 182 to, both, provide power to optical unit 194 and refrain from providing power to optical unit 194 based on a movement of smart mouse 180 caused by a user and detecting periods of inactivity, respectively. In the embodiment illustrated in FIG. 1, smart mouse 180 includes one battery 182. In other embodiments, smart mouse 180 may include any number of additional batteries suitable for providing power to optical unit 194.

In the embodiment illustrated in FIG. 1, power switch 184 may be a suitable system, apparatus, or device operable to electrically couple/decouple battery 182 to/from optical unit 194. In particular, MCU 190 may send power switch 184 a signal (e.g., a voltage) causing power switch 184 to close, or a "close signal," in response to receiving the signal from mechanical switch 188 indicating that smart mouse 180 has been moved by a user. Once closed, or in a "closed power switch position," power switch 184 electrically couples battery 182 to optical unit 194 thereby electrically enabling smart mouse 180 for use. In contrast, MCU 190 may send power switch 184 a signal causing power switch 184 to open, or an "open signal," in response to MCU 190 determining that first and second threshold periods of inactivity have occurred. Once open, or in an "open power switch position," power switch 184 electrically decouples battery 182 from optical unit 194 thereby electrically disabling smart mouse 180 for use. In one embodiment, power switch 184 may be or include a field-effect transistor (FET) having source, gate, and drain terminals. In other embodiments, power switch 184 may be or include a metal-oxide-semiconductor field-effect transistor (MOSFET), a bipolar junction transistor (BJT), and/or any other type of transistor suitable for electrically coupling/decoupling battery 182 to/from optical unit 194.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
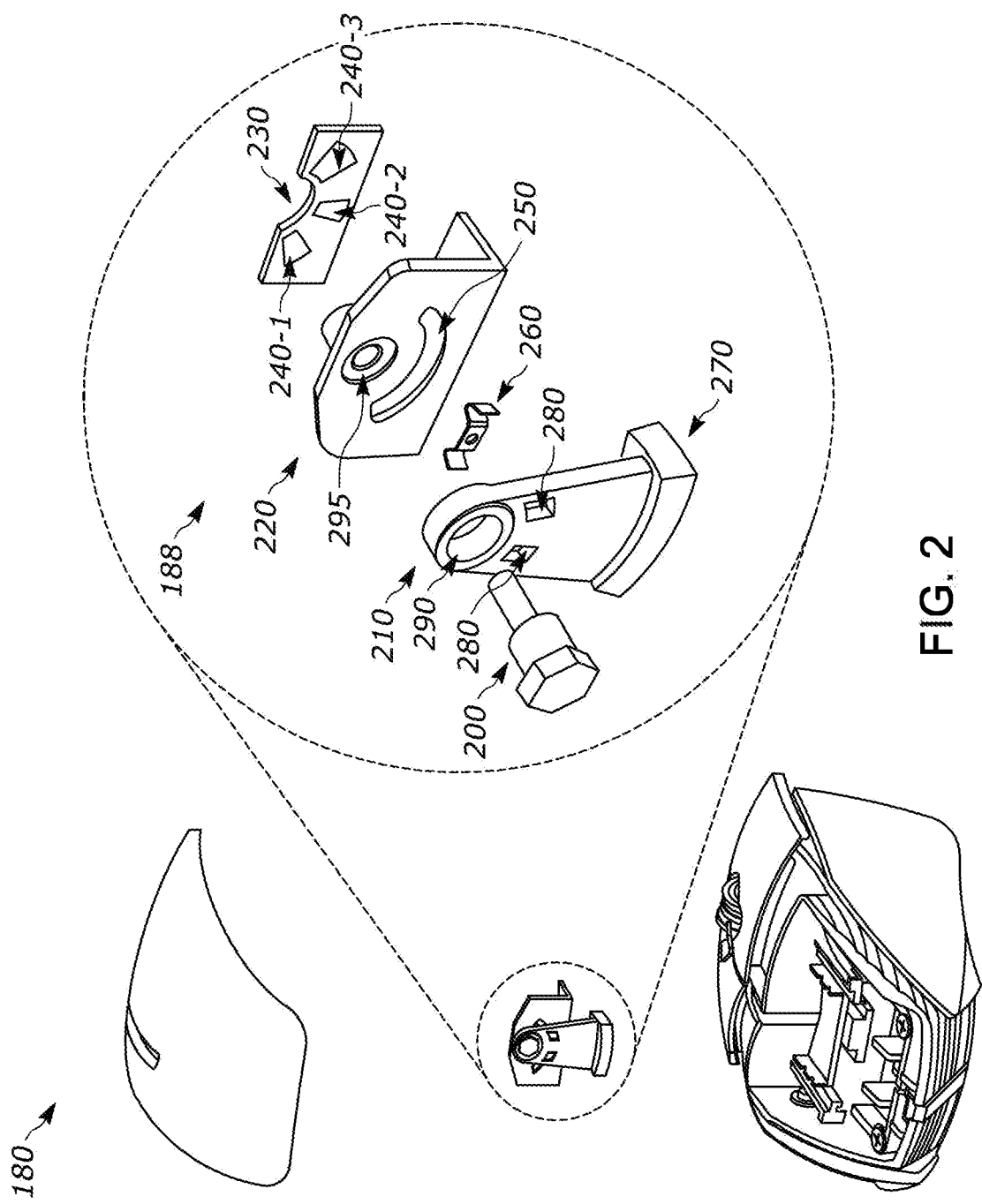
FIG. 2 is an exploded view of an embodiment of a mechanical switch of a smart mouse.

FIG. 2 is an exploded view of an embodiment of a mechanical switch of a smart mouse. Mechanical switch 188 may be positioned within smart mouse 180 such that mechanical switch 188 may detect a movement of smart mouse 180 caused by a user. For example, a user may apply one or more lateral forces to smart mouse 180 in order to move a cursor displayed on information handling system 100. In the embodiment shown in FIG. 2, mechanical switch 188 includes a pendulum pivot fastener 200, a pendulum arm 210, a switch spring finger 260, an assembly bracket 220, and a switch board 230. In other embodiments, mechanical switch 188 may include additional, fewer, and/or any combination of elements suitable for detecting a movement of smart mouse 180 caused by a user.

In the embodiment illustrated in FIG. 2, pendulum arm 210 may be a suitable system, apparatus, or device operable to swing in response to a user causing smart mouse 180 to move. Specifically, pendulum arm 210 may pivot about pendulum hole 290 at a first pendulum end in response to a user applying one or more lateral forces to smart mouse 180 causing smart mouse 180 to move laterally over a surface (e.g., a desk surface, table surface, mouse pad, and the like). The lateral movement of smart mouse 180 may cause pendulum arm 210 to pivot, or oscillate, about pendulum hole 290 due, in part, to a centripetal force applied to pendulum arm 210 caused by the lateral movement. In one embodiment, pendulum hole 290 may be configured to rotatably couple with pendulum pivot fastener 200 such that pendulum arm 210 may hang from pendulum pivot fastener 200 allowing pendulum arm 210 to swing freely within smart mouse 180. Additionally, pendulum arm 210 may include a pendulum weight 270 at a second pendulum end that provides additional mass allowing pendulum arm 210 to swing. That is, pendulum weight 270 may have a higher density than the first pendulum end of pendulum arm 210 causing the second pendulum end of pendulum arm 210 to swing while pivoting about pendulum hole 290 at the first pendulum end. In one embodiment, pendulum weight 270 may be comprised of the same material (e.g., plastic) as the first pendulum end of pendulum arm 210. In another embodiment, pendulum weight 270 may be comprised of a higher density material (e.g., steel) than the first pendulum end of pendulum arm 210.

In the embodiment illustrated in FIG. 2, switch spring finger 260 may be a suitable system, apparatus, or device operable to cause mechanical switch 188 to be in the closed position in response to a movement of smart mouse 180 caused by a user. In particular, switch spring finger 260 may be removably coupled to pendulum arm 210 such that switch spring finger 260 can complete the electrical circuit (i.e., comprised of mechanical switch 188, battery 182, and MCU 190) thereby causing mechanical switch 188 to be in the closed position as pendulum arm 210 swings. Once additional movement caused by the user has ended, pendulum arm 210 may return to equilibrium causing switch spring finger 260 to break the electrical circuit thereby causing mechanical switch 188 to be in the open position. In the embodiment shown in FIG. 2, switch spring finger 260 may be removably coupled to pendulum arm 210 using switch spring finger holes 280 disposed on the first pendulum end of pendulum arm 210. In one embodiment, switch spring finger 260 may be comprised of copper. In other embodiments, switch spring finger 260 may be comprised of copper-covered steel, copper alloy, aluminum, and/or any other type of conductive material suitable for causing mechanical switch 188 to be in the closed position.

In the embodiment illustrated in FIG. 2, assembly bracket 220 may be a suitable system, apparatus, or device operable to provide a pivot point for pendulum arm 210. In particular, assembly bracket 220 may include a bracket hole 295 disposed at a first bracket end of assembly bracket 220 configured to couple with pendulum pivot fastener 200, thereby coupling pendulum arm 210 to assembly bracket 220. In addition, assembly bracket 220 may include a semicircular hole 250 at a second bracket end of assembly bracket 220 configured to allow switch spring finger 260 to traverse semicircular hole 250 as pendulum arm 210 pivots about pendulum hole 290. That is, switch spring finger 260 may extend through semicircular hole 250 from pendulum arm 210 such that switch spring finger 260 may cause mechanical switch 188 to be in the closed position as pendulum arm 210 swings.

In the embodiment illustrated in FIG. 2, switch board 230 may be a suitable system, apparatus, or device operable to electrically couple with switch spring finger 260 to cause mechanical switch 188 to be in the closed position in response to a movement of smart mouse 180 caused by a user. Specifically, switch board 230 may be comprised of a printed circuit board (PCB) that includes one or more contact pads having alternating electrical polarities. In the embodiment shown in FIG. 2, switch board 230 includes contact pads 240-1 through 240-3 (collectively referred to herein as "contact pads 240"). Here, contact pads 240-1 and 240-2 may have opposite electrical polarities (i.e., positive and negative electrical polarities) such that switch spring finger 260 may electrically couple with both contact pads simultaneously while pendulum arm 210 is swinging, thereby bridging the gap between contact pads 240-1 and 240-2 and closing the electrical circuit within switch board 230. Similarly, contact pads 240-2 and 240-3 may have opposite electrical polarities such that switch spring finger 260 may electrically couple with both contact pads simultaneously to bridge the gap between contact pads 240-2 and 240-3 causing the electrical circuit within switch board 230 to close. Once the electrical circuit within switch board 230 is closed, mechanical switch 188 may transmit a signal (e.g., a GPIO signal) to MCU 190 indicating that smart mouse 180 has been moved by a user. In one embodiment, contact pads 240 may be comprised of copper. In other embodiments, contact pads 240 may be comprised of copper-covered steel, copper alloy, aluminum, and/or any other type of conductive material suitable for causing mechanical switch 188 to be in the closed position.

In the embodiment illustrated in FIG. 2, pendulum pivot fastener 200 may be a suitable system, apparatus, or device operable to couple pendulum arm 210, assembly bracket 220, and switch board 230 such that pendulum arm 210 may swing freely in response to a movement of smart mouse 180 caused by a user. In particular, pendulum pivot fastener 200 may be rotatably coupled to pendulum arm 210 via pendulum hole 290. Passing through pendulum hole 290, pendulum pivot fastener 200 may be coupled to bracket hole 295, thereby coupling pendulum arm 210 to assembly bracket 220. Passing through bracket hole 295, pendulum pivot fastener 200 may be coupled to smart mouse 180. In one embodiment, pendulum pivot fastener 200 may be coupled to smart mouse 180 in a threaded manner (e.g., using a bolt, screw, stud, and the like). In other embodiments, pendulum pivot fastener 200 may be coupled to smart mouse 180 using crimping, adhesive, soldering, and/or any other type of fastening technique used to mechanically join pendulum pivot fastener 200 to smart mouse 180.

Figure 3A:
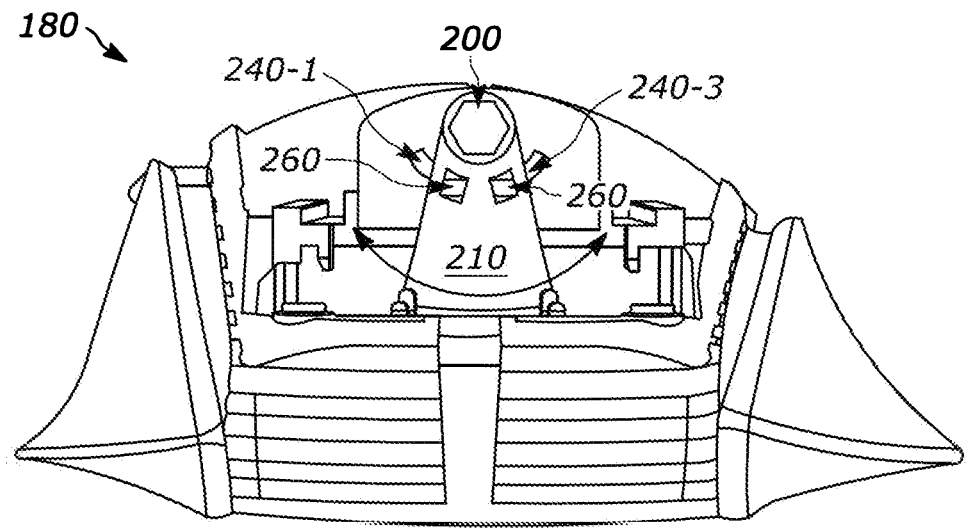
FIGS. 3A-3C are front views of an embodiment of a mechanical switch of a smart mouse.
Figure 3B:
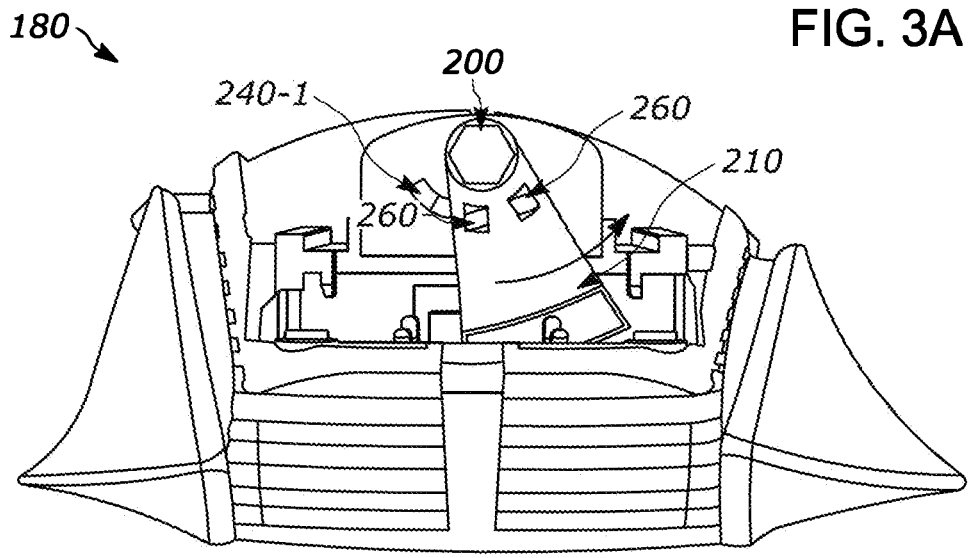
Figure 3C:
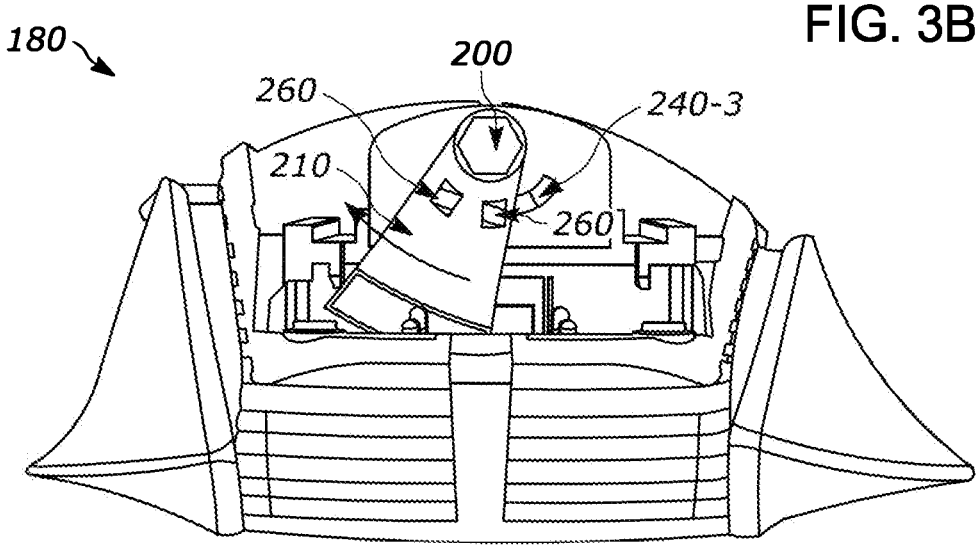

FIGS. 3A-3C are front views of an embodiment of a mechanical switch of a smart mouse. In the embodiments shown in FIGS. 3A-3C, pendulum arm 210 of mechanical switch 188 may swing freely left and right with respect to the back end of smart mouse 180 (shown in figure) in response to a movement of smart mouse 180 caused by a user. In particular, pendulum arm 210 may swing in response to one or more forces applied to smart mouse 180 by a user causing smart mouse 180 to move while in use.

In the embodiment shown in FIG. 3A, smart mouse 180 is electrically disabled for use in response to periods of inactivity in which smart mouse 180 has remained motionless (e.g., with no movement caused by a user). Because smart mouse 180 has not been moved by a user, pendulum arm 210 is hanging in equilibrium such that switch spring finger 260 is not electrically coupled with contact pads 240, thereby breaking the electrical circuit within switch board 230 causing mechanical switch 188 to be in the open position. In addition, the electrical circuit comprised of mechanical switch 188, battery 182, and MCU 190 is broken such that mechanical switch 188 is restricted from transmitting the signal to MCU 190 indicating that smart mouse 180 has been moved by a user. Because MCU 190 has not received the signal indicating that smart mouse 180 has been moved by the user, MCU 190 has waited for first and second threshold periods of inactivity to occur. In response to determining that the first threshold period occurred, MCU 190 has caused itself to be in an idle state for low power consumption. In response to determining that the second threshold period occurred, MCU 190 has caused optical unit 194 (not shown in figure) of smart mouse 180 to be in the off state, thereby electrically disabling smart mouse 180 for use such that the battery life of battery 182 (not shown in figure) will be conserved.

In the embodiment shown in FIG. 3B, smart mouse 180 is electrically enabled for use in response to a user causing smart mouse 180 to move. As shown in FIG. 3B, the movement of smart mouse 180 has caused pendulum arm 210 to pivot about pendulum pivot fastener 200 while swinging to the right, thereby electrically coupling switch spring finger 260 to contact pads 240-2 and 240-3 (not shown in FIG. 3B). In particular, one or more lateral forces applied to smart mouse 180 by a user have caused lateral movement of smart mouse 180. Because contact pads 240-2 and 240-3 have opposite electrical polarities, switch spring finger 260 bridges the gap between contact pads 240-2 and 240-3 causing the electrical circuit within switch board 230 to close causing mechanical switch 188 to be in the closed position. While in the closed position, mechanical switch 188 may transmit the signal indicating that smart mouse 180 has been moved to MCU 190 causing MCU 190 to exit the idle state. Upon exiting the idle state, MCU 190 may cause battery 182 to provide power to optical unit 194 causing optical unit 194 to be in the on state, thereby electrically enabling smart mouse 180 for use.

Similarly, smart mouse 180 is electrically enabled for use in the embodiment shown in FIG. 3C. Here, an additional movement of smart mouse 180 has caused pendulum arm 210 to pivot about pendulum pivot fastener 200 while swinging to the left, thereby electrically coupling switch spring finger 260 to contact pads 240-1 and 240-2 (not shown in FIG. 3C). In particular, one or more lateral forces applied to smart mouse 180 by the user have caused additional lateral movement of smart mouse 180. Because contact pads 240-1 and 240-2 have opposite electrical polarities, switch spring finger 260 bridges the gap between contact pads 240-1 and 24-2 in a similar manner to that described in FIG. 3B. While in the closed position, mechanical switch 188 may again transmit the signal indicating that smart mouse 180 has been moved by the user to MCU 190 causing MCU 190 to refrain from entering the idle state and optical unit 194 to remain in the on state. However, once movement caused by a user has ended for a first threshold period, MCU 190 may again cause itself to be in the idle state. Additionally, once MCU 190 has been in the idle state for a second threshold period, MCU 190 may cause battery 182 to refrain from providing power to optical unit 194 causing optical unit 194 to be in the off state as described in FIG. 3A.

FIG. 4 is a block diagram of selected elements of an embodiment of a smart mouse. In the embodiment illustrated in FIG. 4, smart mouse 180 includes battery 182, power switch 184, optical unit 194, MCU 190, and mechanical switch 188. Optical unit 194 includes sensor 186 and LED 192. MCU 190 is electrically coupled to battery 182 via mechanical switch 188. Battery 182 is electrically coupled to optical unit 194 via power switch 184.

To cause smart mouse 180 to be electrically enabled for use, mechanical switch 188 can transmit signal 430 to MCU 190 while mechanical switch 188 is in the closed position in response to a movement of smart mouse 180 caused by a user. In one embodiment, mechanical switch 188 may transmit signal 430 to a GPIO pin of MCU 190 causing the GPIO pin to go from a low voltage to a high voltage indicating a movement caused by a user. In another embodiment, mechanical switch 188 may transmit signal 430 to a GPIO pin of MCU 190 causing the GPIO pin to go from a high voltage to a low voltage indicating a movement caused by a user. Once MCU 190 receives signal 430 from mechanical switch 188, MCU 190 may transmit close signal 420 to power switch 184 causing power switch 184 to be in the closed power switch position. The closed power switch position of power switch 184 allows battery 182 to provide power 400 to optical unit 194 via power switch 184. While optical unit 194 receives power 400 from battery 182 via power switch 184 in the closed power switch position, optical unit 194 is in the on state causing smart mouse 180 to be electrically enabled for use.

To cause smart mouse 180 to be electrically disabled for use, mechanical switch 188 may remain in the open position in response to periods of inactivity in which smart mouse 180 remains motionless. Because mechanical switch 188 is in the open position, mechanical switch 188 is restricted from transmitting signal 430 to MCU 190. Therefore, MCU 190 does not receive signal 430 causing MCU 190 to wait for a first threshold period for additional movement caused by the user. In response to determining that the first threshold period has occurred, MCU 190 may cause itself to be in an idle state for low power consumption. MCU 190 may also wait for a second threshold period for additional movement caused by the user. In response to determining that the second threshold period has occurred, MCU 190 may transmit open signal 440 to power switch 184 causing power switch 184 to be in the open power switch position. The open power switch position of power switch 184 causes battery 182 to refrain from providing power 400 to optical unit 194 via power switch 184. In response to the loss of power 400 provided to optical unit 194, optical unit 194 is in the off state causing smart mouse 180 to be electrically disabled for use.

Figure 5:
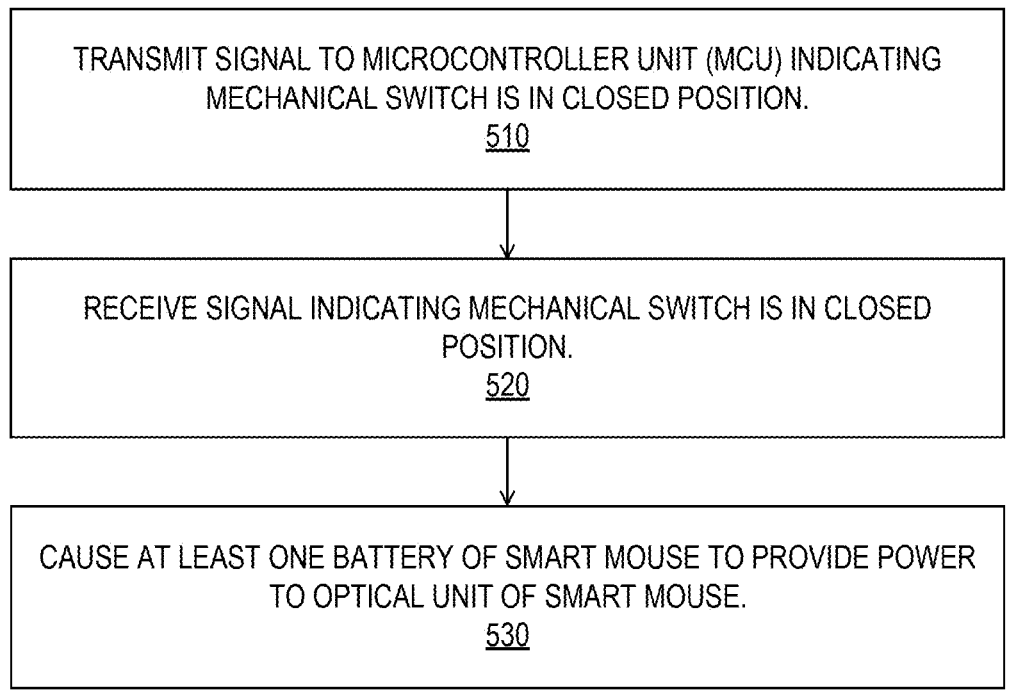
FIG. 5 is a flowchart depicting selected elements of an embodiment of a method for electrically enabling a smart mouse of an information handling system using a mechanical switch.

FIG. 5 is a flowchart depicting selected elements of an embodiment of a method for electrically enabling a smart mouse of an information handling system using a mechanical switch. It is noted that certain operations described in method 500 may be optional or may be rearranged in different embodiments.

Method 500 may begin at step 510, where mechanical switch 188 may transmit a signal to MCU 190 in response to a movement of smart mouse 180 caused by a user. The movement of smart mouse 180 may cause mechanical switch 188 to be in the closed position and the transmitted signal indicates that mechanical switch 188 is in the closed position. For example, mechanical switch 188 may transmit signal 430 to MCU 190 as illustrated in FIG. 4. In step 520, MCU 190 may receive the signal transmitted by mechanical switch 188. In response to receiving the signal, MCU 190 may cause battery 182 of smart mouse 180 to provide power to optical unit 194 (i.e., sensor 186 and LED 192) in step 530. The provided power may cause optical unit 194 to be in the on state causing smart mouse 180 to be electrically enabled for use.

Figure 6:
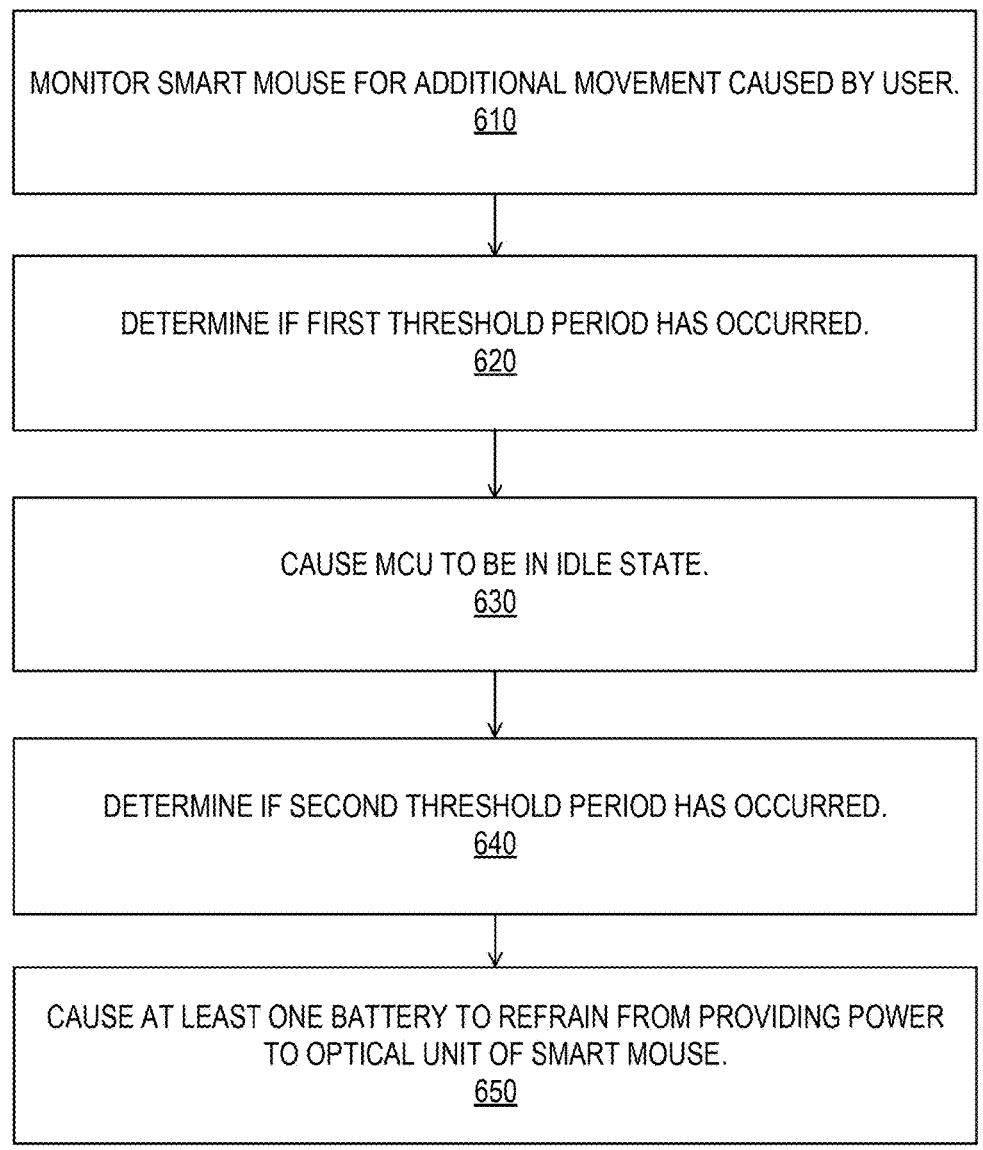
FIG. 6 is a flowchart depicting selected elements of an embodiment of a method for electrically disabling a smart mouse of an information handling system using a mechanical switch.

FIG. 6 is a flowchart depicting selected elements of an embodiment of a method for electrically disabling a smart mouse of an information handling system using a mechanical switch. It is noted that certain operations described in method 600 may be optional or may be rearranged in different embodiments.

Method 600 may begin at step 610, where MCU 190 can monitor smart mouse 180 for an additional movement of smart mouse 180 caused by the user. In step 620, MCU 190 can determine if a first threshold period has occurred, where the first threshold period comprises a period of time in which the additional movement caused by the user has ended. In step 630, MCU 190 can cause itself to be in an idle state. For example, MCU 190 may enter an idle state for low power consumption in response to a period of inactivity in which smart mouse 180 is not being used. In step 640, MCU 190 can determine if a second threshold period has occurred, where the second threshold period comprises a period of time in which MCU 190 has been in the idle state. In response to determining that the second threshold period has occurred, MCU 190 may cause battery 182 to refrain from providing power to optical unit 194 causing optical unit 194 to be in the off state in step 650. The off state of optical unit 194 causing smart mouse 180 to be electrically disabled for use.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A smart mouse for an information handling system, the smart mouse comprising:
   at least one battery;
   a microcontroller unit;
   an optical unit having an on state and an off state;
   a mechanical switch configured to transmit a signal to the microcontroller unit in response to a movement of the smart mouse caused by a user, the mechanical switch including:
   a pendulum arm configured to swing in response to the movement of the smart mouse;

a switch spring finger removably coupled to the pendulum arm, the switch spring finger configured to electrically couple with one or more contact pads having opposite electrical polarities to cause the mechanical switch to be in a closed position; and the microcontroller unit configured to:

receive the signal from the mechanical switch;

cause the at least one battery to provide power to the optical unit, the provided power causing the optical unit to be in the on state, the on state of the optical unit causing the smart mouse to be electrically enabled for use;

monitor the smart mouse for an additional movement of the smart mouse caused by the user;

determine if a first threshold period has occurred, the first threshold period comprising a period of time in which the additional movement of the smart mouse caused by the user has ended; and in response to determining that the first threshold period has occurred:

cause the microcontroller unit to be in an idle state;

determine if a second threshold period has occurred, the second threshold period comprising a period of time in which the microcontroller unit has been in the idle state;

in response to determining that the second threshold period has occurred:

cause the at least one battery to refrain from providing power to the optical unit causing the optical unit to be in the off state, the off state of the optical unit causing the smart mouse to be electrically disabled for use.

2. The smart mouse of claim 1, wherein the smart mouse further includes:

a power switch electrically coupling the at least one battery to the optical unit, the power switch having an open power switch position and a closed power switch position, the power switch configured to:

receive a close signal transmitted from the microcontroller unit in response to the microcontroller unit receiving the signal from the mechanical switch; and in response to receiving the close signal, cause the power switch to be in the closed power switch position, the closed power switch position causing the at least one battery to provide power to the optical unit causing the optical unit to be in the on state.

3. The smart mouse of claim 2, wherein the power switch is further configured to:

receive an open signal transmitted from the microcontroller unit in response to the microcontroller unit determining that the second threshold period has occurred; and in response to receiving the open signal, cause the power switch to be in the open power switch position, the open power switch position causing the at least one battery to refrain from proving power to the optical unit causing the optical unit to be in the off state.

4. The smart mouse of claim 1, wherein the pendulum arm includes:

a first pendulum end including a pendulum hole configured to rotatably couple with a pendulum pivot fastener, the pendulum pivot fastener configured to removably couple the mechanical switch to the smart mouse; and a second pendulum end including a pendulum weight configured to cause the pendulum arm to pivot about the pendulum hole in response to the movement of the smart mouse.

5. The smart mouse of claim 4, wherein the mechanical switch further includes:

an assembly bracket having a first bracket end and a second bracket end, the first bracket end including a bracket hole configured to couple with the pendulum pivot fastener, the second bracket end including a semicircular hole configured to allow the switch spring finger to traverse the semicircular hole as the pendulum arm pivots about the pendulum hole.

6. The smart mouse of claim 1, wherein the movement of the smart mouse caused by the user comprises a lateral movement caused by one or more lateral forces applied to the smart mouse by the user.

7. The smart mouse of claim 1, wherein the signal transmitted to the microcontroller unit in response to the movement of the smart mouse caused by the user comprises a general-purpose input/output (GPIO) signal.

8. A method for electrically enabling and electrically disabling a smart mouse for an information handling system using a mechanical switch, the method comprising:

receiving, by the smart mouse, an input from a user, the input causing a movement of the smart mouse causing a pendulum arm of the smart mouse to swing;

causing, by the pendulum arm, a switch spring finger to electrically couple with one or more contact pads having opposite electrical polarities to cause the mechanical switch to be in a closed position, the switch spring removably coupled to the pendulum arm;

transmitting, by the mechanical switch of the smart mouse, a signal to a microcontroller unit of the smart mouse in response to the movement of the smart mouse caused by the user, the signal indicating that the mechanical switch is in the closed position;

receiving, by the microcontroller unit, the signal indicating that the mechanical switch is in the closed position;

causing, by a power switch of the smart mouse, at least one battery of the smart mouse to provide power to an optical unit of the smart mouse, the provided power causing the optical unit to be in an on state, the on state of the optical unit causing the smart mouse to be electrically enabled for use;

monitoring, by the microcontroller unit, the smart mouse for an additional movement of the smart mouse caused by the user;

determining, by the microcontroller unit, if a first threshold period has occurred, the first threshold period comprising a period of time in which the additional movement of the smart mouse caused by the user has ended;

in response to determining that the first threshold period has occurred:

causing, by the microcontroller unit, the microcontroller unit to be in an idle state;

determining, by the microcontroller unit, if a second threshold period has occurred, the second threshold period comprising a period of time in which the microcontroller unit has been in the idle state; and in response to determining that the second threshold period has occurred:

causing, by the power switch, the at least one battery to refrain from providing power to the optical unit causing the optical unit to be in an off state, the off state of the optical unit causing the smart mouse to be electrically disabled for use.

9. The method of claim 8, wherein causing the at least one battery of the smart mouse to provide power to the optical unit of the smart mouse comprises:

receiving, by the power switch, a close signal transmitted by the microcontroller unit in response to the microcontroller unit receiving the signal indicating that the mechanical switch is in the closed position; and in response to receiving the close signal:

causing, by the close signal, the power switch to be in a closed power switch position, the closed power switch position causing the at least one battery to provide power to the optical unit causing the optical unit to be in the on state.

10. The method of claim 8, wherein causing the at least one battery to refrain from providing power to the optical unit comprises:

receiving, by the power switch, an open signal transmitted by the microcontroller unit in response to determining that the second threshold period has occurred; and in response to receiving the open signal:

causing, by the open signal, the power switch to be in an open power switch position, the open power switch position causing the at least one battery to refrain from providing power to the optical unit causing the optical unit to be in the off state.

11. The method of claim 8, wherein the power switch is configured to electrically couple and electrically decouple the at least one battery and the optical unit.

12. The method of claim 8, wherein the optical unit includes at least one of:

a light emitting diode (LED) configured to illuminate a surface underneath the smart mouse; and a sensor configured to capture a plurality of successive images of the surface to detect a movement of the smart mouse.

13. The method of claim 8, wherein the movement of the smart mouse caused by the user comprises a lateral movement caused by one or more lateral forces applied to the smart mouse by the user.

14. The method of claim 8, wherein the signal transmitted to the microcontroller unit in response to the movement of the smart mouse caused by the user comprises a general-purpose input/output (GPIO) signal.

* * * * *